Patented May 14, 1935

2,001,201

UNITED STATES PATENT OFFICE 2,001,201

PYRIDINO COMPOUNDS AND THEIR PRODUCTION

Max Albert Kunz, Mannheim, and Gerd Kochendoerfer and Karl Koeberle, Ludwigshafen-on-the-Rhine, Germany, assignors to I. G. Farbenindustrie Aktiengesellschaft, Frankfort-on-the-Main, Germany No Drawing. Application December 24, 1931, Serial No. 583,144. In Germany December 27, 1930

2 Claims. (Cl. 260—40)

The present invention relates to pyridino compounds of the aromatic series and process of producing the same.

Skraup's synthesis for the preparation of quinoline, its homologues, analogues and substitution products thereof from aromatic amines by treatment with glycerine and sulphuric acid with an addition of nitrobenzene or other oxidizing agents has hitherto been employed industrially to but a very slight extent in spite of numerous proposed modifications, in part due to the violence of the reaction and the usually small yields.

We have now found that, contrary to expectation, by carrying out the Skraup reaction by means of glycerine in the presence of an oxidizing agent in sulphuric acid from about 40 to 75 per cent strength, in particular from 60 to 70 per cent strength, not only are excellent, in part even quantitative, yields obtained in most cases, but also the reaction proceeds without violence at temperatures between about 110° and 160° C. It is immaterial whether the necessary water to dilute the sulphuric acid to the extent stated is added mixed with the reaction components or as such. The process according to the present invention may be employed to produce pyridino compounds from the amines of one, two or three-ringed iso- or heterocyclic aromatic compounds which, however, in the case of three-ringed isocyclic compounds should not contain keto groups in para-position to each other. Amines which may be used for the purpose of the invention are, for example, mono- and poly-amino compounds derived from benzene, its homologues and substitution products, for example, aniline, toluidine, halogenanilines, nitranilines, halogennitranilines, carboxylic and sulphonic acids of the said amino compounds, phenylene diamine and its substitution products, the amines of naphthalene and its substitution products, aminofluorenes, aminoanthracenes, aminophenanthrenes. Suitable amines of the heterocyclic series are, for example, those derived from pyridine, quinoline, naphthoquinoline, acridine, naphthostyril, carbazole, diphenyleneoxide and the primuline bases. Instead of the free amines, derivatives thereof substituted on the nitrogen atom which under the working conditions are converted into the amines may be used, for example the N-acyl compounds, such as the acetyl, benzoyl and similar compounds, or azomethines may be employed as starting materials. As oxidizing agents may be mentioned aromatic nitro compounds, in particular nitrobenzene, preferably in the form of its sulphonic acids, and arsenic acid. The addition of substances assisting oxidation has proved advantageous for which purpose vanadium pentoxide and selenic oxide may be used.

As regards the economy of the process, it is important that distilled glycerine need not be employed, but that the crude glycerine containing water obtained by the cleavage of fats (saponificate) may be employed equally well.

The following examples will further illustrate the nature of this invention but the invention is not restricted to these examples. The parts are by weight.

Example 1

180 parts of nitrobenzene are sulphonated by warming on a waterbath for a short time with 650 parts of 23 per cent oleum until unchanged nitrobenzene cannot any more be detected when diluting a sample with water. After cooling, 300 parts of water, 100 parts of aniline and 260 parts of 90 per cent aqueous glycerine are added and the whole is heated to boiling while stirring under a reflux condenser. The boiling point of the homogeneous, quietly boiling liquid is 138° C. and it falls to 127° C. during the conversion which lasts from about 6 to 7 hours. After that time, the separation of oxy metanilic acid in a crystalline form is observed. The mixture is diluted with about the same volume of water, the metanilic acid is filtered off by suction after cooling, a little sodium nitrite is added to decompose any aniline which has not been quite converted, the whole is made alkaline and the quinoline is distilled off with steam. The distillate is extracted with ether, the ether solution dried over caustic potash and the oil remaining after expelling the ether is distilled. A small amount of first runnings is obtained and then the quinoline passes over at from 229° to 230° C. in an amount of 106 parts.

Example 2

90 parts of nitrobenzene are heated with 300 parts of 23 per cent oleum as described in Example 1 in a vessel lined with lead and after cooling, 110 parts of water, 50 parts of aniline and 150 parts of an aqueous saponificate (crude glycerine) containing from about 80 to 85 per cent glycerine are introduced and the mixture heated. The liquid commences to boil quietly at 140° C. and the temperature falls to from 128° to 129° C. within the course of from 6 to 7 hours. The whole is allowed to cool, about the same volume of water is added and the separated oxymetanilic acid is filtered off by suction. Milk of lime is added to the hot filtrate until the reaction of the liquid is still just acid to congo. The whole is concentrated, made alkaline and the quinoline distilled with steam. The distillate separates into two layers. The supernatant liquid, which contains small amounts of quinoline, is employed for diluting the acid in the next batch. The crude quinoline is dried with caustic alkali or quicklime and distilled in vacuo. After a small amount of first runnings, which usually contain traces of aniline and may be worked up with later batches, 53 parts of quinoline are obtained.

*Example 3*

A mixture of 40 parts of aniline, 210 parts of a 69 per cent sulphuric acid, 110 parts of dehydrated glycerine and 50 parts of sodium nitrobenzene sulphonate is heated under a reflux condenser while stirring. The mixture commences to boil quietly at 139° C. and the temperature falls to 128° C. during the course of 7 hours while the metanilic acid formed gradually separates out. The reaction mixture is worked up as described in Example 1.

*Example 4*

54 parts of para-toluidine are dissolved in 750 parts of a 64 per cent sulphuric acid and 200 parts of sodium nitrobenzene sulphonate and 170 parts of 90 per cent aqueous glycerine are introduced. The whole is heated to boiling under a reflux condenser, the temperature being 135° C. and falling to 130° C. during the course of 4 hours. The further working up is carried out in the manner described in Example 1. The yield of 6-methylquinoline is 57 parts.

*Example 5*

100 parts of ortho-chloraniline are boiled gently in 800 parts of sulphuric acid of 66 per cent strength with 200 parts of nitrobenzene sulphonic acid and 150 parts of about 90 per cent aqueous glycerine while stirring until a sample no longer contains unchanged initial material (for example until a sample is no longer diazotizable) which is usually the case after 2 hours. The whole is then allowed to cool, is diluted with water, made alkaline and distilled with steam. After the reaction product has been separated in the usual manner, it is dried. The yield is from about 100 to 107 parts of 8-chlorquinoline, i. e. about 82 per cent of the theoretical yield.

From para-chloraniline, 6-chlorquinoline is obtained in a similar manner as a pale green yellow oil which solidifies to almost colorless crystals.

2,5-dichloraniline, when treated with glycerine, sulphuric acid of the aforesaid concentration and nitrobenzene sulphonic acid, yields 5.8-dichlorquinoline in very good yields. This compound crystallizes in the form of long colorless needles.

*Example 6*

54 parts of 2,4-dichloroaniline are dissolved in 750 parts of a 64 per cent sulphuric acid, 160 parts of sodium nitrobenzene sulphonate and 140 parts of 90 per cent aqueous glycerine are introduced and the mixture is heated to boiling. After several hours, when the boiling point no longer decreases, the whole is diluted with water, freed from small amounts of impurities by filtration and the filtrate is made alkaline. The 6,8-dichlorquinoline, which separates out in an excellently pure state, may be crystallized from alcohol. It is obtained in a yield of 55 parts in the form of a colorless crystal powder.

*Example 7*

20 parts of 3,4,5-trichloraniline are dissolved in 200 parts of 66 per cent sulphuric acid while stirring at from 80° to 90° C. 40 parts of nitrobenzene sulphonic acid and 30 parts of 90 per cent aqueous glycerine are then added and the whole is heated to boiling until the reaction is completed. The reaction mixture is then allowed to cool, diluted, made alkaline and the reaction product which separates in a crystalline form is filtered off by suction. The yield of 5,6,7-trichlorquinoline amounts to 98 per cent of the theoretical yield. It crystallizes from glacial acetic acid in the form of colorless needles which are practically insoluble in water.

5,6,8-trichlorquinoline is obtained in an analogous manner from 2,4,5-trichloraniline.

By the same process, 4-nitro-2-chloraniline yields 6-nitro-8-chlorquinoline which crystallizes in the form of yellowish needles.

Instead of the chloro derivatives, the corresponding bromanilines or iodoanilines may be converted into the corresponding quinolines.

*Example 8*

50 parts of para-nitraniline are dissolved in 700 parts of sulphuric acid of 69 per cent strength and heated to boiling for several hours while stirring with 120 parts of 90 per cent aqueous glycerine and 200 parts of an aqueous arsenic acid containing about 80 per cent of $H_3AsO_4$. The initial temperature of 139° C. falls to about 134° C. The reaction mixture is diluted with water, freed from small amounts of impurities by filtration and made alkaline whereby the 6-nitroquinoline separates in the form of grey crystals. It is filtered off by suction, washed until neutral and may, if desired, be crystallized from alcohol with an addition of animal charcoal, whereby it is obtained in an amount of 45 parts in a pure white form.

Ortho- and meta-nitranilines may also be converted into the corresponding quinolines in a similar manner.

*Example 9*

100 parts of para-amido benzoic acid are dissolved in 1500 parts of 64 per cent sulphuric acid. 300 parts of 90 per cent aqueous glycerine and 300 parts of sodium nitrobenzene sulphonate are added and the mixture is boiled for from about 5 to 6 hours under a reflux condenser. After dilution with the same amount of water, the mixture is filtered, made slightly alkaline, shaken well with animal charcoal and filtered. Acetic acid is then added whereby the quinoline-6-carboxylic acid is precipitated in the form of small grey crystals. These are filtered off by suction, washed and dried. The yield is 85 parts. The acid may, if desired, be crystallized from organic solvents.

Other phenylamino carboxylic acids may be converted into the corresponding quinoline carboxylic acids in a similar manner.

*Example 10*

50 parts of para-para'-diaminobenzophenone are suspended in 600 parts of 66 per cent sulphuric acid. After adding 100 parts of nitrobenzene sulphonic acid and 75 parts of 90 per cent aqueous glycerine, the reaction mixture is heated while stirring until it boils gently. It is kept boiling gently for several hours and then allowed to cool, diluted with water, rendered alkaline with caustic soda solution, the precipitate filtered by suction, washed until neutral and dried. The crystalline reaction product, obtained in a practically quantitative yield, namely dipyridinobenzophenone corresponding to the formula

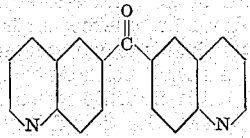

crystallizes in pale yellow needles. The corresponding pyridino compounds are obtained in a similar manner from other amino compounds of benzophenone.

By treating para-para'-diaminodiphenylmethane with glycerine, arsenic acid and 66 per cent sulphuric acid, the corresponding dipyridino-diphenylmethane derivative is obtained.

Example 11

50 parts of para-aminoacetanilide are suspended while stirring in 600 parts of 66 per cent sulphuric acid. 100 parts of nitrobenzene sulphonic acid and 75 parts of 90 per cent aqueous glycerine are added, the mixture is heated to boiling for several hours, allowed to cool, diluted with water, made alkaline and the reaction product which separates in the form of lustrous silver spangles is filtered off by suction. It may be crystallized from monochlorbenzene and is identical with the phenanthridine described in the literature.

Example 12

10 parts of 6-aminoquinoline are dissolved in 100 parts of 66 per cent sulphuric acid. 15 parts of glycerine and 20 parts of nitrobenzene sulphonic acid are added while stirring, the whole heated to boiling for from 2 to 3 hours, allowed to cool after the reaction is completed and worked up in the usual manner. The reaction product which separates in very good yields in the form of lustrous silver felt-like needles is identical with the phenanthridine described in Example 11.

Example 13

12 parts of beta-naphthylamine are dissolved in 240 parts of 64 per cent sulphuric acid, 24 parts of aqueous glycerine (90 per cent strength) and 20 parts of sodium nitrobenzene sulphonate are added and the whole heated to the boiling point for 4 hours under a reflux condenser. After that time, when the temperature has fallen from 138° to 131° C., the mixture is diluted with water and treated with such an amount of milk of lime that it shows congo acid reaction. After pressing off the sludge of gypsum, the whole is made alkaline while cooling whereby the beta-naphthoquinoline is precipitated in the form of fine crystalline scales. These are filtered off by suction, washed until neutral and the product is fused together on a waterbath. After cooling, the supernatant liquid is decanted and the solid crystalline cake distilled in vacuo. The beta-naphthoquinoline corresponding to the formula

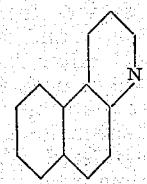

is obtained in the form of a pale yellow crystalline mass in a yield of from 12 to 13 parts.

Alpha-naphthoquinoline is obtained in a similar manner from alpha-naphthylamine and the corresponding dipyridinonaphthalene from aminonaphthoquinoline.

Example 14

10 parts of aminonaphthostyril (prepared from naphthostyril (1,8-aminonaphthoic acid anhydride) by nitration and reduction) are heated to boiling in admixture with 220 parts of 64 per cent sulphuric acid, 25 parts of aqueous glycerine of 28° Baumé and 20 parts of sodium nitrobenzene sulphonate. The duration of the reaction is from 4 to 5 hours. After cooling, the mixture is rendered slightly acid to congo by the addition of alkali, small amounts of resin are filtered off and sodium acetate is added whereby the pyridinonaphthostyril which probably corresponds to the formula:

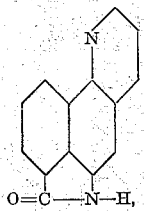

is precipitated. It may be obtained in the form of colorless crystals by crystallization from trichlorbenzene.

Example 15

30 parts of 1-amino-5-nitronaphthalene are dissolved in 300 parts of 65 per cent sulphuric acid while heating. 50 parts of 90 per cent aqueous glycerine and 80 parts of nitrobenzene-metasulphonic acid are introduced. The mixture is kept boiling gently for from 5 to 6 hours and, after diluting with water, alkali is added until the reaction of the solution is still acid to congo. The precipitate is filtered off and an excess of alkali is added to the filtrate. The 5-nitro-1(N),2-pyridino-naphthalene, an almost colorless solid substance, which separates is filtered off by suction and dried. It may be obtained in a crystalline form from organic solvents, in which it is readily soluble.

Example 16

65 parts of nitrobenzene sulphonic acid and 70 parts of 90 per cent aqueous glycerine are added to a solution of 20 parts of 1,5-naphthalenediamine in 450 parts of 64 per cent sulphuric acid. The mixture is heated to boiling for from 4 to 5 hours under a reflux condenser and then poured into water. Small amounts of impurities are filtered off and the filtrate is made alkaline. The 1(N)-2,5(N),6-dipyridinonaphthalene separates in the form of a grey mass in an almost quantitative yield. It may be crystallized from organic solvents, as for example alcohol.

Example 17

60 parts of meta-aminophenol, 600 parts of a 63 per cent sulphuric acid, 100 parts of sodium nitrobenzene sulphonate and 120 parts of 90 per cent aqueous glycerine are heated to boiling for from 5 to 6 hours under a reflux condenser. After cooling the mixture, it is rendered slightly acid to congo by the addition of alkali whereby a dark mass is precipitated. This is filtered off and an excess of soda solution is added to the filtrate. A yellow grey mass, partly in a crystalline form, is precipitated and this is filtered off by suction and washed until neutral. By crystallization, as for example from mono-chlorbenzene, 7-hydroxyquinoline is obtained therefrom as a product readily soluble in alkalies and acids.

*Example 18*

100 parts of 2-naphthylamino-6-sulphonic acid are suspended in 700 parts of a 63 per cent sulphuric acid and the suspension heated to boiling under a reflux condenser while stirring. After the addition of 170 parts of nitrobenzene sulphonic acid sodium salt and 120 parts of 90 per cent aqueous glycerine the sulphonic acid slowly passes into solution. When after a few hours the boiling temperature remains constant, the mixture is diluted with from 2000 to 3000 parts of water and allowed to cool. The 2-naphthoquinoline-6-sulphonic acid corresponding to the formula

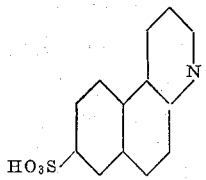

separating in crystalline form and in a very good yield is filtered off, washed with water and dried. It is very readily soluble in a dilute soda solution and may be recrystallized from dilute sulphuric acid and is thus obtained in fine colorless needles.

Other 2-naphthylamino-sulphonic acids may be converted in a similar manner into the corresponding 2-naphthoquinoline sulphonic acids.

*Example 19*

300 parts of 1-naphthylamino-5-sulphonic acid are introduced into a solution of nitrobenzene sulphonic acid prepared by warming 270 parts of nitrobenzene with 1200 parts of a 17 per cent oleum and subsequent dilution with 600 parts of water. After the addition of 360 parts of a 90 per cent aqueous glycerine the whole is boiled under a reflux condenser while stirring whereby the acid slowly passes into solution. After a few hours the solution is diluted with from 1000 to 2000 parts of water, whereby the 1-naphthoquinoline-5-sulphonic acid corresponding to the formula

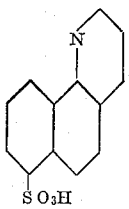

separates in crystalline form in about quantitative yield. The acid is filtered off freed from mineral acid by washing and dried. It is entirely insoluble in cold dilute acids and readily soluble in dilute alkaline solutions.

Other 1-naphthylamino-sulphonic acids, for example the naphthionic acid may be converted in an analogous manner into the corresponding 1-naphthoquinoline sulphonic acids.

*Example 20*

100 parts of crude 2,8-aminohydroxynaphthalene-6-sulphonic acid are introduced into a solution of nitrobenzene sulphonic acid prepared by warming 90 parts of nitrobenzene with 400 parts of a 17 per cent oleum and subsequent dilution with 200 parts of water, whereupon 110 parts of 90 per cent aqueous glycerine are added. The whole is boiled under a reflux condenser while stirring for a few hours, is then diluted with from 1000 to 2000 parts of water, the 8-hydroxy-2-naphthoquinoline-6-sulphonic acid corresponding to the formula

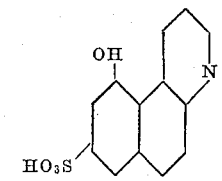

separated in crystalline form and in a very good yield, filtered off and slowly washed with hot water.

*Example 21*

50 parts of tetrahydro-2-naphthylamine, 600 parts of a 65 per cent sulphuric acid, 140 parts of nitrobenzene sulphonic acid and 90 parts of a 90 per cent aqueous glycerine are heated to boiling under a reflux condenser for a few hours. After cooling the reaction mixture is diluted with about 1000 parts of water, filtered, the filtrate rendered alkaline and extracted with ether. After evaporation of the ether the remaining oil is distilled in vacuo. The semi-solid mass obtained is a mixture of linear and angular tetrahydro-2-naphthoquinoline corresponding to the formulæ

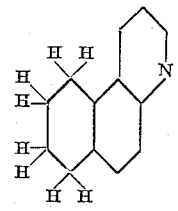

and

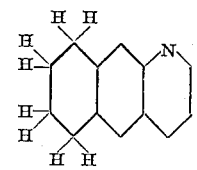

respectively.

*Example 22*

50 parts of 3,6-diaminoacridine are introduced into a solution of nitrobenzene sulphonic acid prepared by warming 90 parts of nitrobenzene with 400 parts of a 17 per cent oleum to about 100° C. and subsequent dilution with 240 parts of water, whereupon 140 parts of 90 per cent aqueous glycerine are added and the whole heated to boiling under a reflux condenser. The boiling point is initially at about 129° C. and falls after about 8 to 9 hours to 127° C. After that time the reaction mixture is diluted with water and so much of alkali is added that the solution is still slightly acid to congo, whereupon impurities which may have separated are filtered off. The filtrate is then rendered alkaline, whereupon the reaction product separates in grey flocks. It is filtered off, washed until neutral and dried. The dipyridino-acridine thus obtained corresponds to the formula

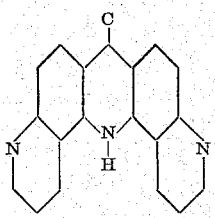

and may be recrystallized from organic solvents.

Example 23

186 parts of aniline are dissolved in 3200 parts of a 69 per cent sulphuric acid, whereupon 160 parts of nitrobenzene and 500 parts of glycerine of 28° Baumé are added. The mixture is then heated to boiling while stirring under a reflux condenser. The boiling point initially is at about 138° C. and falls in the course of a few hours to 135° C. Nitrobenzene cannot then anymore be detected. The whole is then allowed to cool, rendered alkaline by the addition of aqueous ammonia and distilled with steam. The distillate is acidified by means of hydrochloric acid and concentrated by evaporation. The quinolinehydrochloride is separated in the form of a double salt by adding zinc chloride to the concentrated solution. The salt is decomposed in the usual manner by means of ammonia and the separated oil distilled in vacuo. The yield of quinoline is about 170 parts.

Example 24

100 parts of aniline are heated to boiling for about 24 hours with 250 parts of nitrobenzene sulphonic acid sodium salt, 260 parts of a 90 per cent aqueous glycerine and 1450 parts of a 55 per cent sulphuric acid. The water formed during the reaction is distilled off so that the initial boiling point of the mixture which is about 126° C. is maintained. On working up the reaction mixture in the usual manner a yield of 84 parts of quinoline is obtained.

When raising after 16 hours the boiling point of the reaction mixture in the above described process to about 135° C. by distilling off more water and keeping the mixture boiling for 8 hours the yield increases to about 97 parts.

Example 25

100 parts of aniline are heated to boiling while stirring with 1280 parts of a 37 per cent sulphuric acid, 250 parts of nitrobenzene sulphonic acid sodium salt and 300 parts of a 90 per cent aqueous glycerine, care being taken that the temperature rises during from 5 to 6 hours from 110° to 150° C. by slowly distilling off water. Boiling is continued for from 1 to 2 hours under a reflux condenser, whereby the boiling temperature decreases by a few degrees. A yield of 107 parts of pure quinoline is obtained.

Example 26

260 parts of nitrobenzene are sulphonated by warming with 800 parts of a 23 per cent oleum, the mixture then being diluted after cooling with 250 parts of water and 70 parts of a 1 per cent aqueous solution of ammonium vanadate. 260 parts of aniline and 500 parts of an 88 per cent crude glycerine are then added to the reaction mixture which is heated to boiling. Care is taken that by slowly distilling off water the boiling point which initially is 130° C. rises in the course of several hours to 165° C., the reaction mixture then being kept at the said temperature for some time. The reaction mixture is then worked up in the usual manner, whereby 269 parts of pure quinoline are obtained.

What we claim is:

1. The improvement in the manufacture of pyridino compounds, which comprises acting on an amine of a from one to three-ringed aromatic compound which in the case of a three-ringed isocyclic compound should not contain keto groups in para-position to each other, with glycerine in the presence of vanadium pentoxide and an aromatic nitro compound selected from the group consisting of nitrobenzene and nitrobenzene sulphonic acids, in a sulphuric acid of from 40 to 75 per cent strength at a temperature between about 110° and 160° C.

2. As new article of manufacture pyridino-naphthostyril corresponding to the formula:

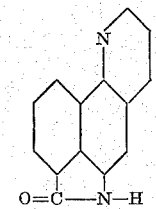

crystallizing from trichlorobenzene in the form of colorless crystals.

MAX ALBERT KUNZ.
GERD KOCHENDOERFER.
KARL KOEBERLE.